(12) United States Patent
Schumacher

(10) Patent No.: US 9,429,462 B2
(45) Date of Patent: Aug. 30, 2016

(54) TWO-WIRE PROCESS VARIABLE INDICATOR WITH MICROENCAPSULATED ELECTROPHORETIC DISPLAY

(71) Applicant: Rosemount Inc., Chanhassen, MA (US)

(72) Inventor: Mark S. Schumacher, Minneapolis, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 13/724,548

(22) Filed: Dec. 21, 2012

(65) Prior Publication Data

US 2013/0162439 A1 Jun. 27, 2013

Related U.S. Application Data

(60) Provisional application No. 61/579,183, filed on Dec. 22, 2011.

(51) Int. Cl.
| | | |
|---|---|---|
| G08B 3/00 | (2006.01) | |
| G01F 23/284 | (2006.01) | |
| G01F 15/06 | (2006.01) | |
| G01F 23/00 | (2006.01) | |

(52) U.S. Cl.
CPC .......... *G01F 23/284* (2013.01); *G01F 15/068* (2013.01); *G01F 23/00* (2013.01)

(58) Field of Classification Search
None
See application file for complete search history.

(56) References Cited

U.S. PATENT DOCUMENTS

| | | | | |
|---|---|---|---|---|
| 5,589,823 A | * | 12/1996 | Lange | 340/622 |
| 5,930,026 A | | 7/1999 | Jacobson et al. | 359/296 |
| 6,452,493 B1 | * | 9/2002 | Ma et al. | 340/533 |
| 6,477,474 B2 | | 11/2002 | Diede | |
| 6,619,118 B1 | * | 9/2003 | Keck | 73/304 C |
| 6,938,478 B2 | * | 9/2005 | Arias | 73/304 R |
| 6,967,640 B2 | | 11/2005 | Albert et al. | |
| 7,107,838 B2 | * | 9/2006 | Chai et al. | 73/304 R |
| 7,321,846 B1 | | 1/2008 | Huisenga et al. | |
| 7,487,793 B2 | * | 2/2009 | Schmitz et al. | 137/558 |
| 7,739,907 B2 | * | 6/2010 | Boiarski | 73/149 |
| 7,779,858 B2 | * | 8/2010 | Schmitz et al. | 137/392 |
| 8,114,298 B2 | * | 2/2012 | Fishler et al. | 210/744 |
| 8,929,948 B2 | | 1/2015 | Vanderaa et al. | |
| 2004/0100281 A1 | | 5/2004 | Nilsson | 324/644 |

(Continued)

FOREIGN PATENT DOCUMENTS

| | | |
|---|---|---|
| CN | 1293761 | 5/2001 |
| CN | 1714908 A | 1/2006 |

(Continued)

OTHER PUBLICATIONS

Search Report and Written Opinion from International application No. PCT/US2012/071283 dated Mar. 12, 2013.
Lexar. When Memory Matters. Product Brochure. Jun. 2012.

(Continued)

*Primary Examiner* — Julie Lieu
(74) *Attorney, Agent, or Firm* — Westman, Champlin & Koehler, P.A.

(57) ABSTRACT

A two-wire process variable indicator includes a housing having a plurality of terminals disposed therein. The terminals are coupleable to a two-wire process control loop. A power module is coupled to the plurality of terminals to receive current flow from the process control loop. Driver circuitry is coupled to the power module and a microencapsulated electrophoretic display is coupled to the driver circuitry.

16 Claims, 3 Drawing Sheets

(56) References Cited

U.S. PATENT DOCUMENTS

| | | | |
|---|---|---|---|
| 2004/0124988 A1* | 7/2004 | Leonard et al. | 340/612 |
| 2005/0229700 A1* | 10/2005 | Chai et al. | 73/304 R |
| 2008/0184775 A1* | 8/2008 | Yamagishi et al. | 73/25.05 |

FOREIGN PATENT DOCUMENTS

| | | |
|---|---|---|
| CN | 101523318 | 9/2009 |
| FR | 2952432 | 5/2011 |
| GB | 1507832 | 4/1978 |
| JP | 2000-65625 | 3/2003 |
| JP | 2004-240911 | 8/2004 |
| JP | 2007-139992 | 6/2007 |
| JP | 2011-525026 | 9/2011 |
| WO | 2011/058258 A1 | 5/2011 |

OTHER PUBLICATIONS

"Rosemount 751 Field Signal Indicator" Product Data Sheet. 00813-0100-4378, Rev EC. Apr. 2012. Emerson Process Management.

First Chinese Office Action for Chinese Patent Application No. 201280003402.6, dated Sep. 3, 2014, 14 pages.

EP Communication from EP 12813696.7, dated Aug. 1, 2014.

Office Action for Australia Patent Application No. 2012358287, dated Jul. 29, 2014.

Third Chinese Office Action for Chinese Patent Application No. 201280003402.6, dated Nov. 12, 2015, 14 pages.

Office Action from Russian Patent Application No. 2014130038, dated Sep. 1, 2015.

Office Action from Canadian Patent Application No. 2,859,984, dated Oct. 9, 2015.

Office Action from Chinese Patent Application No. 201280003402. 6, dated Apr. 28, 2015.

Office Action from Japanese Patent Application No. 2014-548958, dated May 12, 2015.

Office Action for Mexican Patent Application No. MX/a/2014/007427, dated Nov. 27, 2015.

fourth Chinese Office Action for Chinese Patent Application No. 201280003402.6, dated Apr. 28, 2016.

\* cited by examiner

TWO-WIRE PROCESS VARIABLE INDICATOR WITH MICROENCAPSULATED ELECTROPHORETIC DISPLAY

CROSS-REFERENCE TO RELATED APPLICATION

The present application is based on and claims the benefit of U.S. provisional patent application Ser. No. 61/579,183, filed Dec. 22, 2011, the content of which is hereby incorporated by reference in its entirety.

BACKGROUND

In industrial settings, control systems are used to monitor and control inventories of industrial and chemical processes and the like. Typically, the control system performs these functions using field devices distributed at key locations in the industrial process and coupled to control circuitry in the control room by a process control loop. The term "field device" refers to any device that performs a function in a distributed control or process monitoring system, including all the devices used measurement, control and monitoring of industrial processes. In such industrial processes, substances such as liquids, slurries, or solids are often stored in large holding or processing tanks. One exemplary type of field device is able to measure the height of a material in a tank and provide an indication of such tank level over a process control loop. Another exemplary type of field device may measure a pressure or flow of liquid flowing through a conduit such as a pipe, and provide such indication over a process control loop. Often, however, it is also useful to provide a local indication of the process variable such that a technician or operator walking near the tank or field device can quickly obtain a visual indication relative to the process variable without needing to interrogate the field device through process communications. One way in which this visual indication has been provided, with respect to tank level indication, is by using a magnetically operated indicator.

SUMMARY

A two-wire process variable indicator includes a housing having a plurality of terminals disposed therein. The terminals are coupleable to a two-wire process control loop. A power module is coupled to the plurality of terminals to receive current flow from the process control loop. Driver circuitry is coupled to the power module and a microencapsulated electrophoretic display is coupled to the driver circuitry.

DETAILED DESCRIPTION OF ILLUSTRATIVE EMBODIMENTS

Figure 1:
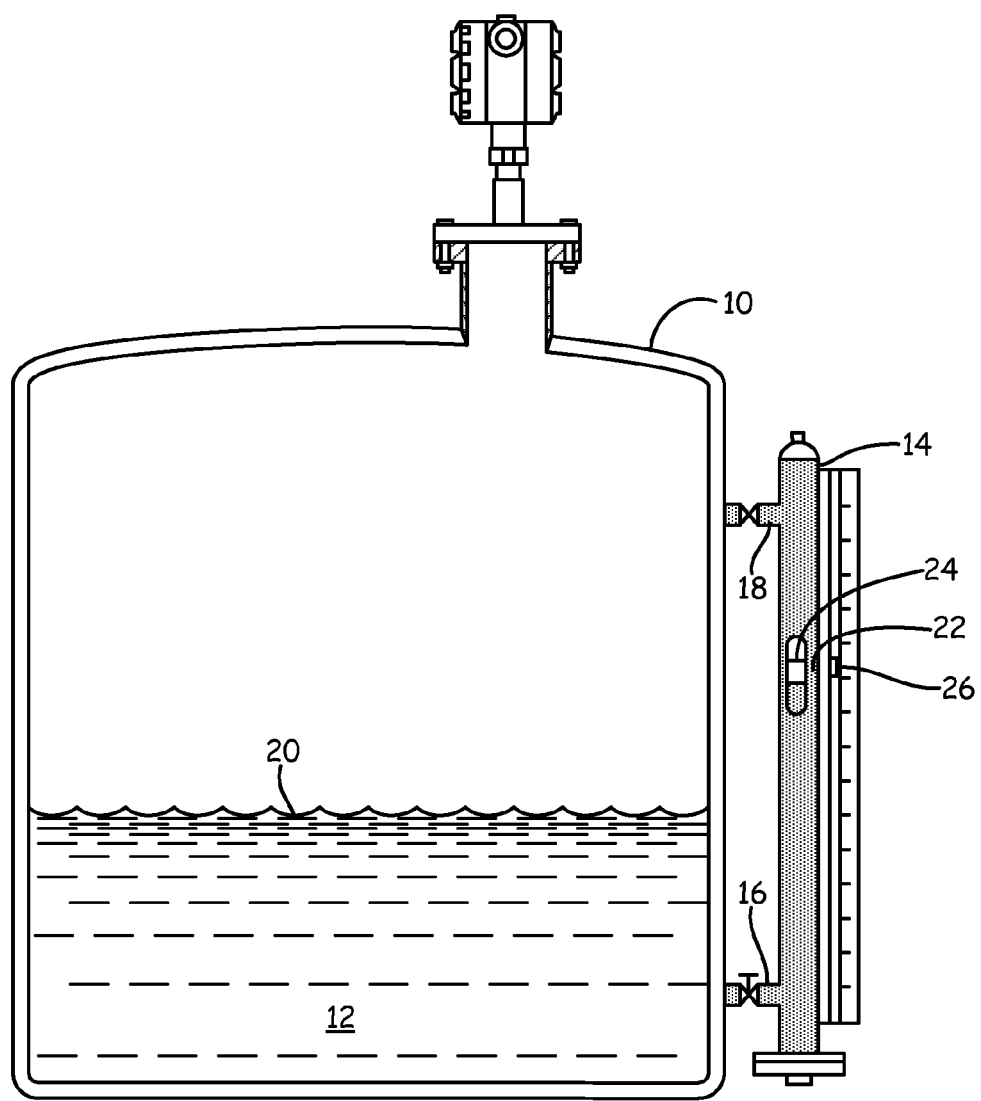
FIG. 1 is a diagrammatic view of a prior art magnetically operated indicator for providing a local indication of material level within a tank in a process plant.

FIG. 1 is a diagrammatic view of a prior art magnetically operated indicator for providing a local indication of material level within a tank in a process plant. Process tank 10 is partially filled with liquid 12. A cylindrical float chamber 14 is fluidically coupled to tank 12 via ports 16 and 18. By virtue of fluidic couplings 16, 18, the level 20 of liquid 12 in tank 10 is mirrored in float chamber 14 as indicated at reference numeral 22. A suitable float 24 floats upon the liquid material in float chamber 14 at level 22. Float 24 is formed of a material that interacts magnetically with indicator 26. In this manner, as the level of float 24 rises or falls with the level 20 of material 12 within tank 10, indicator 26 will rise or fall accordingly.

While the system indicated in FIG. 1 is useful for providing a quick local indication of tank level for an operator or technician, it often requires a custom engineered and fabricated float chamber and pressure vessel that must comply with pressure vessel code requirements for each indicator. In addition, the float itself is usually custom engineered for each application to ensure that it "floats" at the proper interface location. As different applications may have liquids with different specific gravities, this can be a challenge. Moreover, this solution necessarily requires that the material be a liquid. The utilization of a magnetic float is simply not possible with a solid material, since the solid material will not effectively flow through fluidic couplings 16, 18. Further still, the entire apparatus must generally be custom-engineered and is relatively large, bulky, and expensive to produce. Thus, substantial expense can be added to provide a system to locally indicate the level of a material within a process tank.

Figure 2:
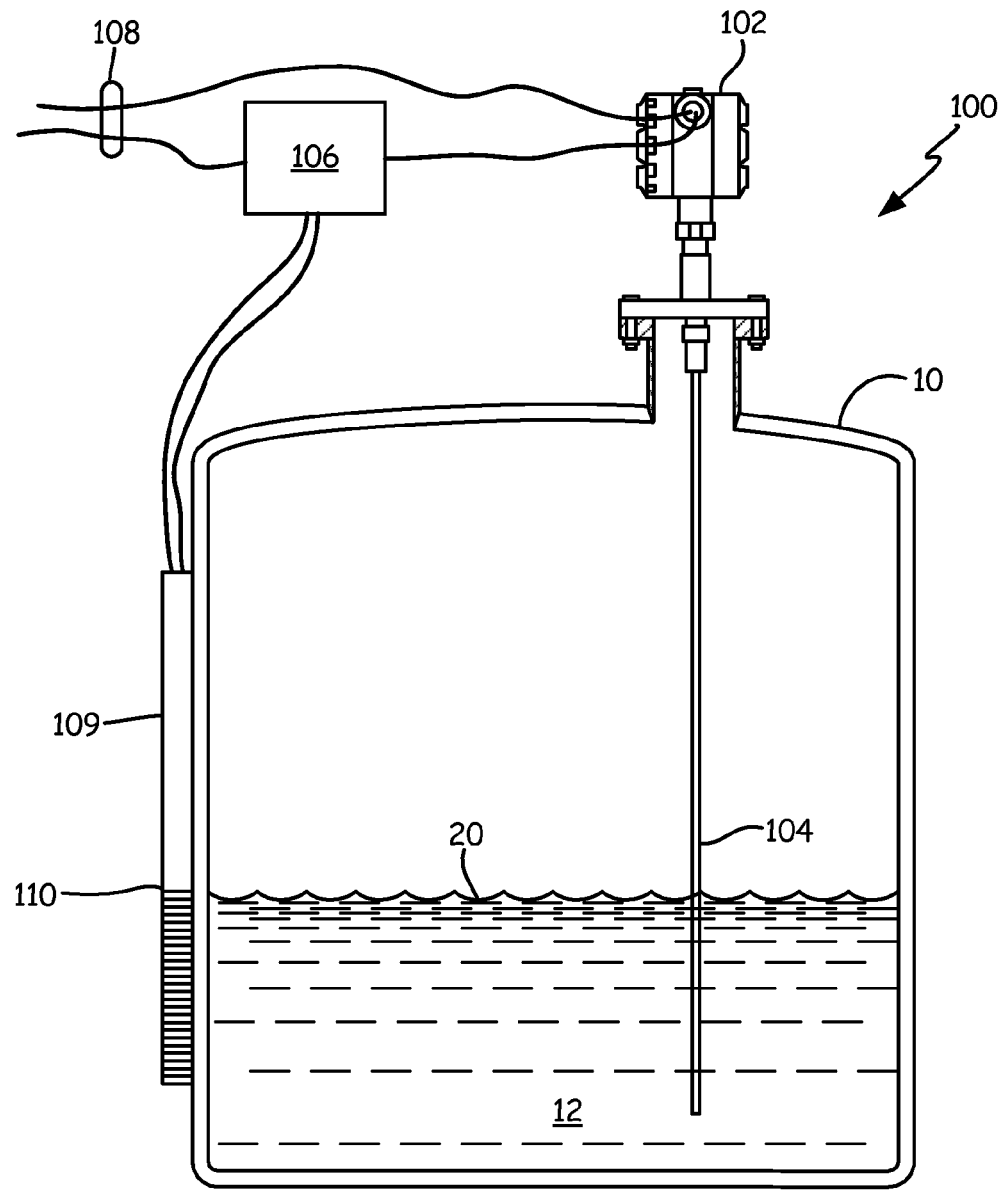
FIG. 2 is a diagrammatic view of a two-wire process variable indicator in accordance with an embodiment of the present invention.

FIG. 2 is a diagrammatic view of a two-wire process variable indicator in accordance with an embodiment of the present invention. Tank level measurement system 100 includes a level measurement transmitter 102 mounted atop tank 10 having a probe 104 extending into tank 10. Process level transmitter 102 is a known device that is able to transmit and receive radar signals along probe 104 which are reflected at discontinuities caused by process fluid interfaces, such as level 20. The time of reflection is measured and is indicative of the level of material within tank 10. While FIG. 2 depicts a "guided wave level measurement system", any suitable level measurement systems, including non-contact full wave measurement systems, ultrasonic systems, and any other suitable systems that are able to accurately measure the level of material within tank 10 can be used. Moreover, some technologies, such as non-contact radar level transmitters are able to measure the level of solids within the tank. Regardless of the device used, tank level transmitter 102 is configured to provide a tank level output over two-wire process control loop 108. The two-wire process control loop may have a 4-20 mA current signal that varies between 4 and 20 mA to represent the process variable. However, other arrangements can be practiced in accordance with embodiments of the present invention. As indicated in FIG. 2, two-wire process variable indicator 106 is electrically disposed in series with transmitter 102. In this manner, the 4-20 mA signal generated by transmitter 102 exists on two-wire loop 108, and can be used by level indicator 106 to generate a level display. Level indicator 106 includes electronics disposed within a housing (illustrated in FIG. 3), such as an explosion proof housing, which electronics are configured to drive an electronic ink display. In some embodiments, the wire connection between level measurement transmitter 102 and level display 106 can be effected by using a standard conduit connection. Level indicator 106 may contain or be coupled directly to electronic ink display 109, or level indicator 106 can be disposed remotely from display 109 and coupled to display 109 using any suitable electronic connection. In some embodiments, level indicator 106 and display 109 comprise a solitary unit that can be mounted on or near tank 10. Level indicator 106 provides a robust, high-contrast level indication locally without requiring any process fluid or process intrusion-type connections to tank 10, as are required for a magnetic float-type indicator system. In embodiments where level indicator 106 and display 109 are mounted to tank 10, such mounting can be performed in any suitable manner including clamping the system to tank 10 or magnetically mounting the system to tank 10. Further still, as indicated in FIG. 2, display 109 can be placed on the sidewall of tank 10 such that level 110 indicated by display 109 corresponds with physical level 20 within tank 10.

Currently, two-wire process variable indicators are known. For example, such an indicator can be obtained from Rosemount Inc. of Chanhassen, Minn., under the trade designation Model 751. However, the Model 751 is based upon liquid crystal technology. Such indicators typically require backlight in order for the liquid crystal display to be useful. While liquid crystal displays are known that do not have backlights, their contrast is somewhat limited, and the ability to read such indicators in daylight is not optimal. Moreover, as the size of a liquid crystal display increases, the power requirements for such display increase as well. Accordingly, providing a relatively large, high-contrast liquid crystal process display may require too much power than can be supplied by a 4-20 mA current loop. In accordance with embodiments of the present invention, a microencapsulated electrophoretic process variable display is provided. The display, in accordance with known techniques, changes the reflectivity of specific locations, or pixels, based upon charges applied to electrophoretic microcapsules. The result is a high-contrast display that requires very little power. Moreover, given that application of a charge to the electrophoretic display causes suitable migration of the microcapsules and that such microcapsules generally maintain their charge, the amount of power required to maintain a display once the initial display has been rendered is vastly reduced in comparison to liquid crystal displays.

Microencapsulated electrophoretic displays are known and essentially mimic ink-on-paper in providing a high contrast black on white displays that can be changed through use of an electronic grid/display driver. Such displays can be flexible, similar to paper, and are very adaptable. In addition, the technology consumes extremely little power. The electrophoretic display is made up of millions of tiny microcapsules, each having the diameter of approximately a human hair. Each microcapsule contains positively charged white particles and negatively charged black particles suspended in a clear fluid. When a positive or negative electric field is applied, corresponding particles move to the top of the microcapsule where they become visible to the user. This makes the surface appear white or black at that location, or pixel. The technology works by reflecting light, and accordingly, does not depend on backlight, such as LCD displays. This provides a very useful display for bright light, such as daylight. Moreover, the high contrast is also believed to be very visible at night in typical plant lighting conditions.

Figure 3:
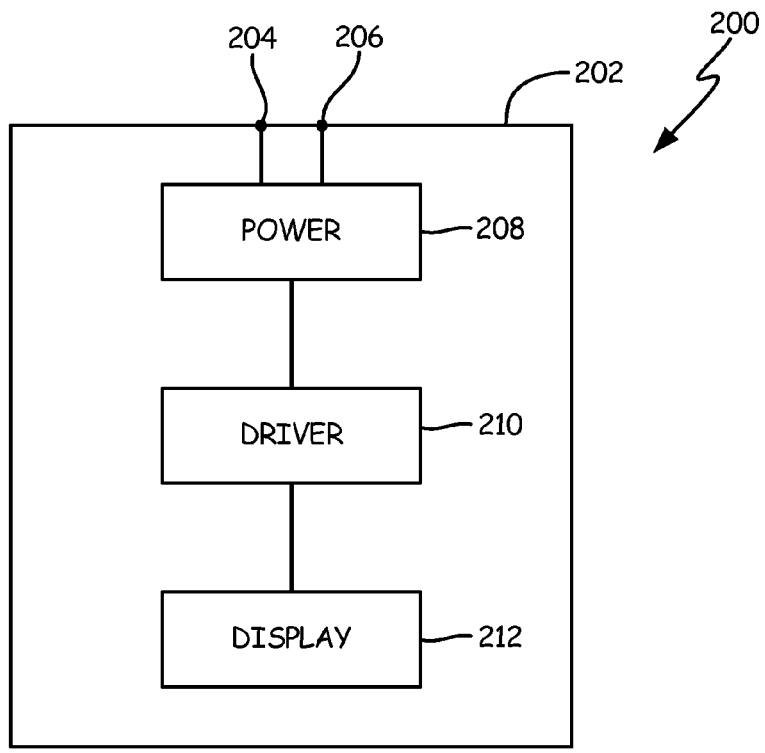
FIG. 3 is a diagrammatic view of a process variable indicator using a microencapsulated electrophoretic display in accordance with embodiment of the present invention.

FIG. 3 is a diagrammatic view of a process variable indicator using a microencapsulated electrophoretic display in accordance with an embodiment of the present invention. Indicator 200 includes housing 202 which, in some embodiments, is an explosion proof housing. Explosion proof transmitter housings and explosion proof enclosures for other process control equipment are known. Explosion proof, as used herein, and according to the National Electrical Code, means that should there be an explosion, it will be contained within the enclosure. In some embodiments, the circuitry within the level indicator 200 is designed in order to comply with intrinsic safety requirements. As used herein, intrinsic safety requirements mean that the circuitry is designed such that even if a short or fault condition is generated, there is not sufficient energy to ignite, or initiate flammable materials that may be disposed in a hazardous location.

Enclosure 202 provides a pair of terminals 204, 206 which are coupleable to a two-wire process control loop. As set forth above, the indicator 200 is disposed in series on the process control loop. Accordingly, the current specified by a process variable transmitter, such as level transmitter 102, flows through terminals 204, 206. Terminals 204, 206 are coupled to power module 208 that is configured to condition, or otherwise receive electrical energy from the two-wire loop and provide suitable energy to electrophoretic driver circuitry 210. Driver circuitry 210 drives microencapsulated electrophoretic display 212 to indicate a value that corresponds to the amount of current flowing through terminals 204, 206. Since the current supplied by the two-wire loop ranges between 4 and 20 mA, all of the circuitry within indicator 200 is limited to consuming a very small fraction of that energy such that the overall process variable communicated to the process control system is not impacted. Moreover, in embodiments where digital information is superimposed on the current signal, the process variable indicator may display other data as well, such as additional process variable, diagnostic data and/or alarms. While the indicator illustrated in FIG. 3 shows display 212 disposed within or adjacent enclosure 202, display 212 can be disposed remotely therefrom, such as indicated in FIG. 2. Moreover, while embodiments of the present invention have generally been described with respect to displaying a level of a material within a process holding tank, embodiments of the present invention can be used to display any process variable that is communicated over a two-wire loop.

Figure 4:
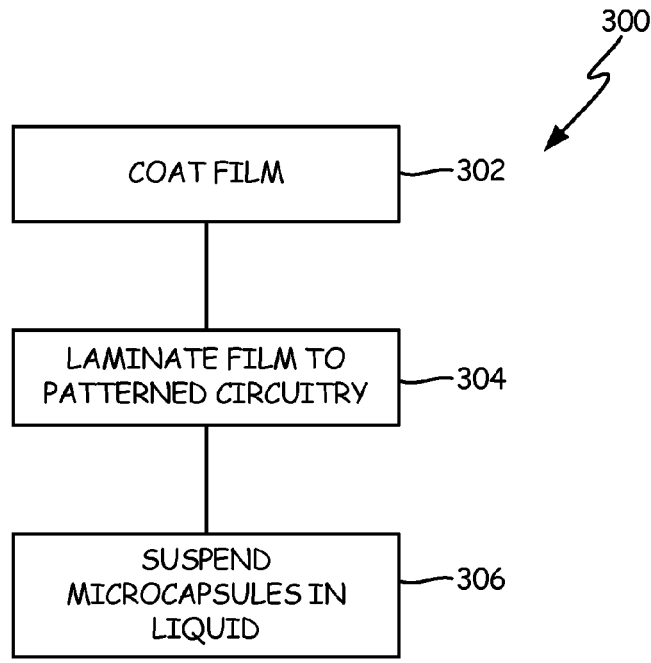
FIG. 4 is a diagrammatic view of a method of forming a microencapsulated electrophoretic display for use with embodiments of the present invention.

FIG. 4 is a diagrammatic view of a method of forming a microencapsulated electrophoretic display for use with embodiments of the present invention. Method 300 begins at block 302 where a sheet of plastic film is coated with electrophoretic microcapsules. At block 304, the coated sheet is laminated to a layer of patterned circuitry. The circuitry forms a pattern of pixels that can then be controlled by a display driver, such as driver 210. Next, at block 306, the microcapsules are suspended in a liquid "carrier medium" allowing them to be coated using existing coating processes. The final laminate can be applied onto virtually any surface, including glass, plastic, fabric and even paper. This flexibility allows the process variable display to be provided at virtually any length and width. Thus, the display can be significantly larger than the housing of the process variable indicator.

Embodiments of the present invention generally provide a new microencapsulated electrophoretic process variable display that is powered by a two-wire 4-20 mA loop. The display consumes very little power, and provides very high contrast. Accordingly, local indications of process variables can now be easily provided in many contexts. For example, the level of a solid material (such as grain) in a tank or container can be easily displayed locally. Such local displays of solids in containers using magnetic indicators of the prior art are not possible since the grain cannot flow effectively into a float chamber.

Although the present invention has been described with reference to preferred embodiments, workers skilled in the art will recognize that changes may be made in form and detail without departing from the spirit and scope of the invention.

What is claimed is:

1. A two-wire process variable indicator comprising:
   a housing;
   a plurality of terminals disposed within the housing and being coupleable to a two-wire process control loop which carries at least one of an analog and a digital signal representative of information related to a process variable wherein the terminals are configured to receive the information from the two-wire process control loop related to the process variable;
   a power module coupled to the plurality of terminals to receive current flow from the process control loop;
   driver circuitry coupled to the power module; and
   a microencapsulated electrophoretic display coupled to the driver circuitry and configured to display information related to the process variable received from two-wire process control loop;
   wherein the driver circuitry and the microencapsulated electrophoretic display are wholly powered with power from the two-wire process control loop.

2. The two-wire process variable indicator of claim 1, wherein each location of the display changes reflectivity based on charge applied by the driver circuitry to electrophoretic microcapsules disposed within the microencapsulated electrophoretic display.

3. The two-wire process variable indicator of claim 1, wherein the microencapsulated display is disposed within the housing.

4. The two-wire process variable indicator of claim 1, wherein the display is larger than the housing.

5. The two-wire process variable indicator of claim 1, wherein the process variable is a level of material in a container, and wherein the microencapsulated electrophoretic display is mounted to the container.

6. The two-wire process variable indicator of claim 5, wherein the material is a solid.

7. The two-wire process variable indicator of claim 1, wherein the current flow varies between 4 and 20 milliamps to indicate a process variable.

8. The two-wire process variable indicator of claim 1, wherein display provides information relative to a plurality of process variables.

9. The two-wire process variable indicator of claim 1, wherein the display provides diagnostic information.

10. The two-wire process variable indicator of claim 1, wherein the display indicates an alarm condition.

11. The two-wire process variable indicator of claim 1, wherein the indicator is mechanically attached to a process material container.

12. The two-wire process variable indicator of claim 11, wherein the indicator is clamped to the process material container.

13. The two-wire process variable indicator of claim 11, wherein the indicator is magnetically coupled to the process material container.

14. The two-wire process variable indicator of claim 1, wherein the housing is explosion-proof.

15. The two-wire process variable indicator of claim 1, wherein the power module and driver circuitry are intrinsically safe.

16. A process variable indicator comprising:
   a housing;
   a plurality of terminals disposed within the housing and being coupleable to a process control loop which carries at least one of an analog and a digital signal representative of information related to a process variable wherein the terminals are configured to receive the information from the process control loop related to the process variable;
   a power module coupled to the plurality of terminals and configured to power the process variable indicator from the process control loop;
   driver circuitry coupled to the power module; and
   a microencapsulated electrophoretic display coupled to the driver circuitry to display an indication of the process variable received from the process control loop;
   wherein the driver circuitry and the microencapsulated electrophoretic display are wholly powered with power from the process control loop.

* * * * *